Oct. 14, 1958      G. V. PECK      2,856,570

ELECTROLYTIC CAPACITOR

Filed June 2, 1954

INVENTOR
Gordon V. Peck
BY
ATTORNEY

United States Patent Office 2,856,570
Patented Oct. 14, 1958

2,856,570

ELECTROLYTIC CAPACITOR

Gordon V. Peck, Indianapolis, Ind., assignor to P. R. Mallory & Co., Inc., Indianapolis, Ind., a corporation of Delaware Application June 2, 1954, Serial No. 433,863

6 Claims. (Cl. 317—230)

The present invention relates generally to electrolytic condensers and has specific pertinency to means and methods including those having the objective of improving the construction of such electrolytic capacitor assemblies so as to anchor the capacitor cartridge in the casing of such an assembly in relation thereto in an improved and economical manner.

It is therefore a prime object of the present invention to provide a novel supporting structure for the cartridge of an electrolytic capacitor assembly, said supporting structure being formed in an integral manner with the casing thereof such as to obviate the necessity for separate mounting means for the cartridge therein.

It is another object of the present invention to provide a novel tapered suporting structure integrally formed of the casing of an electrolytic capacitor assembly in a manner such that the support is adapted to align and substantially fix the location of said cartridge within said container.

Still another object of the present invention is to provide a casing adapted to have formed from the bottom thereof a tapered support centrally located on said bottom and adapted to rigidly maintain and align an associated capacitor cartridge.

Still another object of the present invention is to provide a new and improved structure for a cartridge within an electrolytic capacitor, said structure being fabricated centrally at the bottom wall of said casing and being unitarily formed thereof in a manner such as to preclude the necessity of separate independent mounting structure for said cartridge and whereby an economical improved cartridge support is provided for said electrolytic capacitor construction.

Still another object of the present invention is to provide a simple and economical means for centrally locating and maintaining a capacitor cartridge of an electrolytic capacitor within its associated container without providing any intermediate means for maintaining the same within, such as is provided by the utilization of pitch or wax.

Still another object of the present invention is to provide a novel support structure for a cartridge of an electrolytic capacitor, said support structure being centrally formed at the bottom wall of said capacitor and being integrally formed therewith to provide a unitary construction, said support therefore being fixedly maintained on said bottom wall without the necessity of providing staking means therefor.

The invention in another of its aspects relates to novel features and instrumentalities described herein for teaching the principal object of the invention and to the novel principles employed in the instrumentalities, whether or not these features and principles may be used in the said object or in the said field.

Other objects and details of the invention considered to be novel will become apparent from the following description and the claims appended hereto, taken in conjunction with the accompanying drawing which shows an embodiment of the invention as incorporating the novel supporting structure for the cartridge employed in an electrolytic capacitor.

This invention is susceptible of embodiment in various and sundry ways and only one such embodiment is illustrated in the accompanying drawing.

Generally speaking, the present invention comprises a supporting structure for a cartridge of an electrolytic capacitor which is adapted to locate the cartridge of said capacitor centrally with respect to the container thereof. The support is of tapered configuration and is integrally fabricated of the bottom of the electrolytic capacitor casing as by being drawn or extruded from the inside surface of the bottom of said casing. The casing further may be a molded casing fabricated specifically of phenolic or other plastic material. At other times, the casing may be fabricated of metal such as aluminum.

In this manner, a supporting means is provided which eliminates the usual wax filling heretofore used so as to retain the cartridge within the electrolytic casing. It has been found that the use of the novel supporting structure, as hereinafter described, and as being fabricated unitarily with the bottom of the electrolytic capacitor casing, provides superior cooling advantages over and above any type of mounting heretofore used when the internal temperatures of the cartridge are such that they rise above that present when the wax or pitch is used. Unless proper cooling is provided the life of the capacitor will become affected because of the high temperature conditions possibly present. This is particularly evident when a high ripple of current is encountered in the operation of the electrolytic capacitor. Thus, an improved overall operation for the capacitor is accomplished and the cost for mounting the cartridge within the capacitor casing is considerably lowered since no extra pieces are needed for placement in the container and materials usually utilized therewith are no longer needed. In addition, the construction here shown affords superior cooling characteristics.

Figure 1:
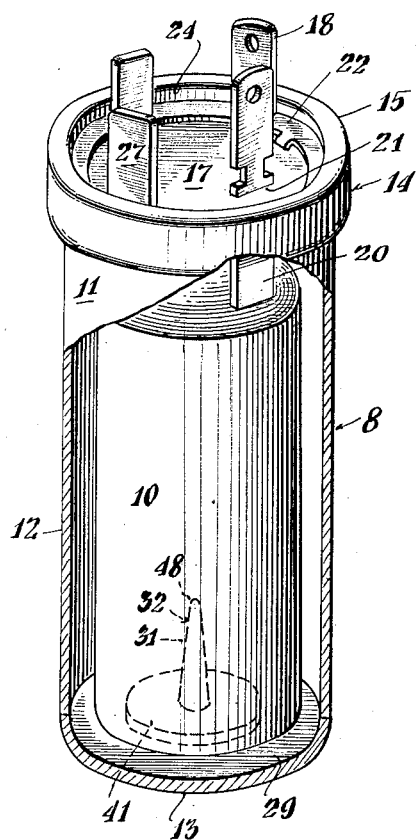
Figure 1 is a vertical, partial cross-sectional view of the invention as particularly adapted to illustrate the supporting arrangement of a cartridge as being maintained within its associated container of the electrolytic capacitor.

Referring to the drawings, Figure 1 shows an electrolytic capacitor 8 including a capacitor cartridge 10 contained within a cylindrical can 11 which comprises an annular side wall 12, a bottom end wall 13 of a greater thickness, and an open end 14. The open end is externally expanded to form an external bead section 15 within which is fitted a series of discs, for instance, a pair of insulative "Bakelite" discs such as 17 with a softer rubber disc sandwiched between them. Capacitor terminal lugs 18 are mounted in discs 17 and the capacitor electrodes within the can 11 are electrically connected to the respective terminal lugs 18 by means of tabs 20 which extend through slots 21 formed in the series of discs.

In order to mount the capacitor 8, a metal ring 22 of substantially the same diameter as the discs 17 is laid against the top surface of said top disc 17. The edge 24 of can 11 is then spun over the surface of the ring to firmly clasp the ring and discs together and seal the open end of the can. Ring 22 is provided with one or more integral lugs 27 bent up from the inner edge of the ring. These lugs provide means to mount the capacitor.

Thus, the capacitor cartridge is mounted within the can at its top end. However, it is necessary to provide an oppositely disposed supporting structure for the bottom end of the cartridge. It is further necessary that this same supporting structure locate the cartridge centrally with respect to the container and to maintain the same therewithin in a substantially fixed manner.

Figure 2:
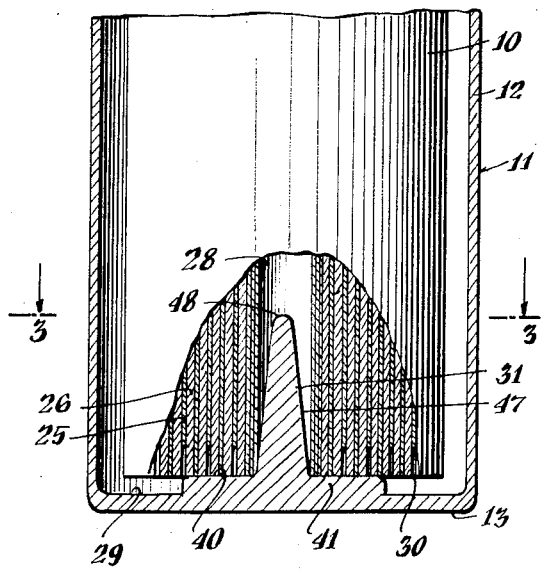
Figure 2 is a vertical, cross-sectional representation of the unitarily formed cartridge support of the present invention as adapted to centrally locate the capacitor cartridge within its associated container.
Figure 3:
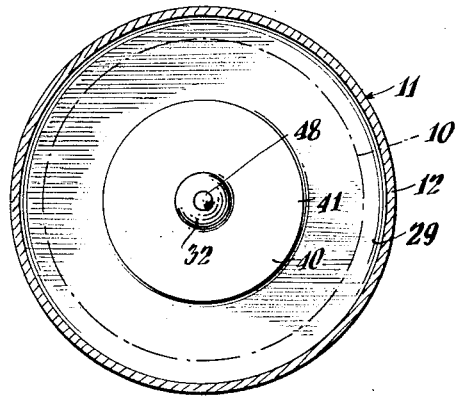
Figure 3 is a horizontal cross-sectional view of an embodiment of the invention as shown in Figure 2 and as taken along the line 3—3 thereof.

In Figures 1–3 the bottom supporting means 32 for centrally locating capacitor cartridge 10 is shown. The supporting structure 32 as shown obviates the need for partially or completely filling the space between the cartridge and its associated container.

As disclosed, the novel support means 32 comprises an unitarily formed support and holder centrally formed at the closed or bottom end 13 of the casing 11. The support is integrally joined to the inside surface 29 by means of a raised annular disc platform 41 having a top surface 40 and an annular side wall 45 connecting the same to the inside surface 29 of the end wall. Rising vertically up from the top surface 40 of the platform 41 is a tapered prong-like main extension 31 having an inclined annular side wall 47 surmounted by apex or tip 48. The support may be fabricated from the internal wall of the casing as by extruding.

In the assembly of the electrolytic capacitor within the casing, the capacitor cartridge 10 which is wound with alternating folds of metal foil 25 and insulating paper 26 has formed therein a central aperture 28 extending throughout the cartridge 10. As noted, the necessary electrical connections are made to the foil turns at the top end thereof. The end 30 opposite thereto has the adjacent opening of aperture 28 adapted to fit over main extension 31 of the unitarily formed prong or pointed piece 32, allowing the entire cartridge to slip thereover to a depth determined by the wall taper of prong 32. As cartridge opening 28 allows cartridge 10 to sink to a determined depth, the adjacent turns thereof are adapted to set upon surface 40 of the annular platform 41 so that the entire cartridge is substantially supported thereby and aligned by the central extension rising therefrom.

It is to be noted that when the electrolytic cartridges are rolled, the cathode foil is placed on the inside of the cartridge and makes several turns around the mandrel before the anodes are inserted. Under these circumstances, if the metal prong or pointed piece 32 makes contact with any metal as it is forced into the mandrel, it would be with the cathode foil and hence cause no harm.

It is to be further pointed out that internally insulated electrolytic capacitors are not being used presently. All electrolytic capacitors today inserted in metal cans are made with the negative terminal and electrolyte grounded. Therefore, there is no desire or necessity to provide insulation in the structure.

The support which may be extruded as a unitary piece from the inside surface of the container 11 which may be fabricated of plastic or metal, forms an integral part thereof whereby great economies are made in construction, fabrication and assembly. It is to be pointed out here that the container may also be fabricated of plastic with the support also being of plastic extruded from the inner wall thereof in the manner and shape heretofore specified for the metal construction.

Thus, the present invention has provided a novel support for anchoring capacitor cartridges within associated containers and eliminates the costly methods of using pitch or wax to fill the space between the cartridge and container. Moreover, the construction here above described greatly reduces work costs where a unit must be re-canned as well as eliminating the electricity and/or power costs attendant to heat and melt the wax or pitch used.

While the present invention, as to its objects and advantages, has been described herein as carried out in specific embodiments thereof, it is not desired to be limited thereby, but it is intended to cover the invention broadly within the spirit and scope of the appended claims.

What is claimed is:

1. In a capacitor including a case having open and bottom walls including an inside surface for said latter wall having a flat, stepped surface, a capacitor cartridge placed within said case, said capacitor cartridge having a top and a bottom, a plurality of tabs therefor, closure means for said capacitor case, a plurality of terminals connected to said tabs of said cartridge, and tapered means centering and supporting said capacitor cartridge within said case separate from said bottom wall thereof, said means extruded from the inside flat surface of said wall to form a unitary structure therewith.

2. In a capacitor including a case having open and bottom walls including an inside flat, stepped surface for said latter wall, a capacitor cartridge placed within said case, said capacitor cartridge having a top and a bottom, a plurality of tabs therefor, closure means for said capacitor case, a plurality of terminals connected to said tabs of said cartridge, and tapered, metal means supporting said capacitor cartridge within said case, said means integrally and unitarily formed of the flat inside surface of said bottom wall and joined thereto by means of an annular disc platform supporting the same as determined distance from both the side and bottom walls of said case and allowing only atmosphere to circumscribe the same obviating the need for pitch or wax to support the cartridge within said case.

3. In a capacitor including a plastic case having open and bottom walls including an inside surface for said latter wall, a capacitor cartridge placed within said case, said capacitor cartridge having a top and a stepped bottom, having a flat top surface, a plurality of tabs therefor, closure means for said capacitor case, a plurality of terminals connected to said tabs of said cartridge, and tapered, plastic means supporting said capacitor cartridge within said case, said means integrally and unitarily formed and extended from the flat inside surface of said bottom wall and joined thereto by means of an annular disc platform supporting the same a determined distance from both side and bottom walls of said case and allowing only atmosphere to circumscribe the same obviating the need for pitch or wax to support the cartridge within said case.

4. In an electrolytic capacitor including a case having open and bottom walls, a capacitor cartridge placed within said casing, said capacitor cartridge having a top and a flat, stepped, bottom, a plurality of tabs therefor, a hole in the botom of said cartridge, closure means for said capacitor case, a plurality of terminals connected to said tabs, and means centering said capacitor cartridge within said case, said means including a metal prong integrally and unitarily joined to a raised annular disc platform and formed of said flat bottom wall of said case, said prong being fitted within said hole, said prong being connected to an annular disc for supporting the cartridge a determined distance from both the side and bottom walls of said case and allowing only atmosphere to circumscribe the same obviating the need for pitch or wax to support the cartridge within said case.

5. In an electrolytic capacitor including a case having open and bottom walls, a capacitor cartridge placed within said casing, said capacitor cartridge having a top and a bottom, a plurality of tabs, and an aperture formed therethrough, closure means for said capacitor case, a plurality of terminals connected to said tabs, said tabs penetrating said closure means, and a metal support connected to the center of and extruded from said inside surface of the bottom wall of said case, said support comprising a solid tapered prong, an annular disc having a flat top surface connected to said bottom by means of a wall of uniform thickness for supporting said prong substantially centrally thereon, said cartridge adapted to have its aperture fit over said prong to maintain the same thereon at a distance determined by said taper of said prong, said disc joining the said prong to said inside surface of said bottom wall of said case.

6. An electrolytic capacitor including a case having open and bottom walls interconnected by an annular side wall, said bottom wall being of a thickness greater than said side wall and having an outer and an inner surface, a cartridge for said capacitor comprising alternate layers of metal foil and insulating paper wound to have a central aperture therethrough, a tapered support therefor comprising an annular disc of uniform thickness substantially centrally disposed on and extruded from said inside surface of said bottom wall of said case, a main solid tapered metal extension unitarily joined to said disc at the center thereof, said extension adapted to fit within said aperture of said cartridge so as to maintain the cartridge in a substantially fixed manner in said case.

References Cited in the file of this patent

UNITED STATES PATENTS 923,774    Creighton _____ June 1, 1909

FOREIGN PATENTS 63,482    Denmark _____ May 14, 1945